(No Model.)
M. J. CUMMINGS.
WHEEL FOR HAND TRUCKS.
No. 383,214. Patented May 22, 1888.
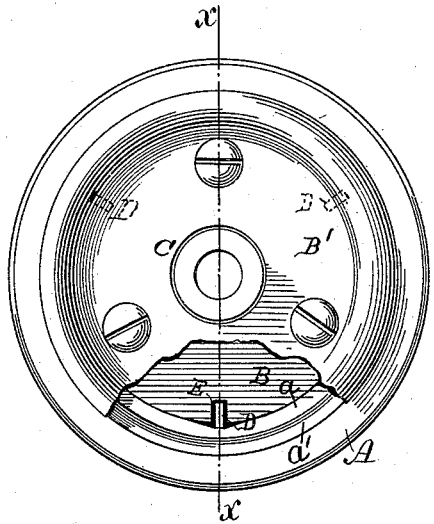
Fig. 1.
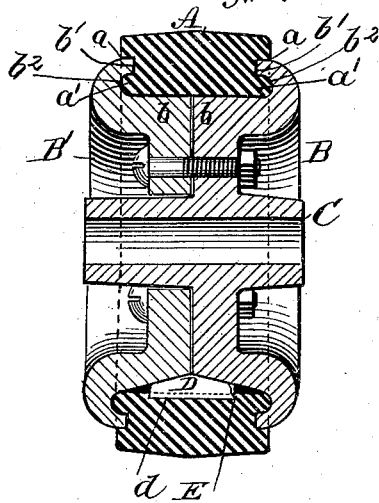
Fig. 2.
Fig. 3.
WITNESSES:
J. D. Garfield.
C. Sedgwick.
INVENTOR:
M. J. Cummings.
BY 
ATTORNEYS.
N. PETERS. Photo-Lithographer, Washington, D. C.

United States Patent Office.

MICHAEL J. CUMMINGS, OF NEW YORK, N. Y.

WHEEL FOR HAND-TRUCKS.

SPECIFICATION forming part of Letters Patent No. 383,214, dated May 22, 1888.

Application filed January 23, 1888. Serial No. 261,652. (No model.)

*To all whom it may concern:*

Be it known that I, MICHAEL J. CUMMINGS, of the city, county, and State of New York, have invented certain new and useful Improvements in Wheels for Hand-Trucks, Casters, &c., of which the following is a full, clear, and exact description.

This invention relates to that class of wheels for casters, trucks, &c., having india-rubber or other noiseless tires, and has for its object to provide a wheel which will firmly clamp and securely hold its tire in place and render it impossible for the same to be slipped off the wheel through hard usage.

My invention consists of two metallic compressing-disks, each having a peripheral flange and an annular shoulder, in combination with a rim or tire of rubber or other easy-rolling material, said tire having annular side grooves approximating its periphery to receive the peripheral flanges on the compressing-disks.

My invention further consists of the two compressing-disks, each having annular shoulders, upon which the compressible tire is mounted, one disk carrying the hub, which passes through a perforation in its fellow disk; also of keys seated in depressions in the annular shoulders of the disks, by means of which the tire is prevented from shifting circumferentially.

Reference is to be had to the accompanying drawings, forming a part of this specification, in which similar letters of reference indicate corresponding parts in all the figures.

Figure 1 is a side view of the wheel, parts being broken away. Fig. 2 is a transverse section of the wheel complete, and Fig. 3 is a perspective view of one of the tire-locking keys.

In the drawings, A represents the elastic rim or tire of the wheel. This tire has annular side grooves, $a$, to receive the peripheral flanges of the disks composing the wheel.

B B' are two compressing-disks, each provided with an annular shoulder, $b$, and a peripheral flange, $b'$, which fits into the groove $a$ of the tire A when the adjacent faces of the disks B B' are brought together to compress and anchor the tire to the wheel. The disks B B' may be locked by screw-bolts or rivets, as desired. When the disks B B' are locked and the flanges $b'$ have entered the grooves $a$ of the tire, the flange $a'$, which is formed in the side faces of the tire by the groove $a$, sets into the annular groove or recess $b^2$ in the inner faces of the peripheral flanges $b'$, thus giving a double lock to the tire A, and making it impossible for the same to be stripped from the wheel while in use. The disk B carries the entire hub C, which is centrally bored for the pintle of the hanger. The hub C, being made integral with the disk B, and passing through a central perforation in the disk B', affords an easy bearing for the pintle and adds greatly to the strength of the wheel.

In order to secure the tire against circumferential shifting, I have provided a tapered locking-key, D, Fig. 3. On the face of the wheel formed by the shoulders $b$ of the fellow disks B B' there are cavities or depressions E, of a shape coincident with that of the key D. When the keys D are placed in the depressions and the disks B B' locked together by the screw-bolts, the said keys are forced out of the depressions into transverse slots $d$, formed on the inner face of the tire, thus preventing the same from shifting.

Having thus fully described my invention, I claim as new and desire to secure by Letters Patent—

A wheel for hand-trucks, casters, &c., consisting of disks B B', provided with annular shoulders $b$, the shoulders having inclined slots or cavities E on their faces, the tapered key D, fitting in the slots E, and the tire A, having transverse slots $d$ on its inner face to register with the slots E and receive part of the key D when the disks are locked.

MICHAEL J. CUMMINGS.

Witnesses:
B. T. HOLSKE,
C. SEDGWICK.